(12) United States Patent
Kakuda (10) Patent No.: US 8,140,124 B2
(45) Date of Patent: Mar. 20, 2012

(54) TERMINAL APPARATUS WITH DATA OUTPUT CAPABILITY

(75) Inventor: Yuji Kakuda, Yokohama (JP)

(73) Assignee: Kyocera Corporation, Kyoto (JP)

( * ) Notice: Subject to any disclaimer, the term of this patent is extended or adjusted under 35 U.S.C. 154(b) by 627 days.

(21) Appl. No.: 11/342,069

(22) Filed: Jan. 27, 2006

(65) Prior Publication Data
US 2006/0195535 A1    Aug. 31, 2006

(30) Foreign Application Priority Data
Jan. 28, 2005   (JP) ................ P.2005-020596

(51) Int. Cl.
*H04B 1/38*    (2006.01)
(52) U.S. Cl. .............. 455/566; 348/14.01; 348/14.02
(58) Field of Classification Search .......... 455/566, 455/42.3
See application file for complete search history.

(56) References Cited

U.S. PATENT DOCUMENTS

| | | | |
|---|---|---|---|
| 7,027,808 B2* | 4/2006 | Wesby ................ | 455/419 |
| 2002/0100058 A1* | 7/2002 | Hirose et al. ............ | 725/113 |
| 2004/0062221 A1* | 4/2004 | Gopalakrishnan et al. ... | 370/335 |
| 2004/0142686 A1* | 7/2004 | Kirkup et al. ............ | 455/420 |
| 2004/0215707 A1* | 10/2004 | Fujita et al. ............ | 709/201 |
| 2004/0258051 A1* | 12/2004 | Lee ................ | 370/352 |
| 2005/0208967 A1* | 9/2005 | Buniatyan ............ | 455/557 |

FOREIGN PATENT DOCUMENTS

| | | |
|---|---|---|
| JP | 11-252165 | 9/1999 |
| JP | 2004-110413 | 4/2004 |

* cited by examiner

*Primary Examiner* — Marcos Batista
(74) *Attorney, Agent, or Firm* — DLA Piper LLP (US)

(57) ABSTRACT

A terminal apparatus is provided that makes it easy to determine whether or not data once saved can be deleted. When data included in a memory is output to an external equipment of the terminal apparatus, output history data including an output destination, an output day and time, and an output section is generated/updated while being correlated with the data. Then, if required, an output history of the data can be displayed based on the output history data after the output of the data.

16 Claims, 7 Drawing Sheets

Note:
In the figures, ⊠ is an icon indicating image data.

TERMINAL APPARATUS WITH DATA OUTPUT CAPABILITY

This application claims foreign priority based on Japanese Patent application No. 2005-020596, filed Jan. 28, 2005, the contents of which is incorporated herein by reference in its entirety.

BACKGROUND OF THE INVENTION

1. Field of the Invention

The present disclosure relates to a terminal apparatus that outputs data to external equipments via wired or wireless communication.

2. Description of the Related Art

A terminal apparatus such as a cellular phone, a PDA (personal digital assistant) and a personal computer performs data communication with external equipments via wired or wireless communication. In relation to the terminal apparatus, some technologies are proposed to enhance user's convenience by saving a data transmission history (output history) of this data communication.

For example, in JP-A-11-252165, a mail system is proposed. In the mail system, on a terminal side, a transmission history is saved, and a delete request mail is prepared and transmitted based on information of the transmission history. Then, on a mail server side, a mail which is transmitted from the terminal side is deleted based on the delete request mail. Accordingly, a wrongly sent mail or the like can be deleted from the terminal side.

In JP-A-2004-110413, a contents distributing system is proposed. In the contents distributing system, a content transmission history is saved for every user. Accordingly, an access performance to the subsequent content is enhanced.

Another examples are known in which a server apparatus stores an output history of images for every user who is authorized to output the images, a camera has a storage for automatically storing a transmission history when image data is transmitted via a network, and the like.

Generally, terminal apparatuses including the above examples respectively have a storing section (memory) to save transmitted (output) data (file). In this case, of course, a data capacity of this storing section is finite. Therefore, when a user recognizes that an available space in the storing section is low, the user needs to delete the data partially, which are already stored in the storing section, so that new data can be stored in the storing section.

In case of partially deleting the data stored in the storing section, the user needs to check the contents of the data sequentially so as to determine whether or not the data can be deleted. As such checking and determining operations need to be applied to a lot of the data stored in the storing section, these operations are very troublesome to the user.

SUMMARY OF THE INVENTION

In some implementations, the present invention may provide a terminal apparatus by which a user can understand where data is output from the terminal apparatus.

One or more embodiments of the invention provide a terminal apparatus which comprises: a plurality of output sections which respectively output data in different systems; and a display which displays an output history for each of the data, the output history indicating that the data is output from at least any one of the output section.

Preferably, one or more embodiments of the invention further comprises: a selecting section for selecting one of the data, wherein the display displays the output history of the selected data.

Preferably, in one or more embodiments of the invention, the display displays the output history for each of the output sections.

Preferably, one or more embodiments of the invention further comprises: a first storing section for storing the data; and a deleting section which deletes one of the data from the first storing section, wherein the display displays the output history of the data to be deleted, before the data is deleted by the deleting section.

Here, "before the data is deleted" is exemplified with the case where the data is selected for the deleting process (operation), a case where a signal instructing to delete the selected data is output, and the like.

Preferably, in one or more embodiments of the invention, when the data and another data which is different from the data are concurrently output from any one of the output sections, the display displays both the output history of the data and information of the another data.

Here, "information of the data" means a data name of the data, contents of the data, and the like.

Preferably, one or more embodiments of the invention further comprises: a second storing section for storing output history data in which the data and the output history of the data are correlated with each other, wherein the display displays the output history based on the output history data.

Preferably, in one or more embodiments of the invention, in response to the output of the data from any one of the output sections, the output history data corresponding to the data is updated.

Preferably, in one or more embodiments of the invention, the plurality of the output sections include at least any two of the systems via a wired communication, via a wireless communication, via an optical communication, via an infrared communication, via a universal serial bus, via a serial transmission, and via a parallel transmission.

Preferably, in one or more embodiments of the invention, the output history includes at least any one of an output destination, an output day and time, and an indication to identify the output section, of the data being output.

Here, "indication to identify the output section" signifies an indication such as a system, a type, a classification and a specific name, of the output section, which are used to identify the individual output section.

DESCRIPTION OF THE PREFERRED EMBODIMENTS

An embodiment of the present invention will be explained with reference to the accompanying drawings hereinafter.

Figure 1:
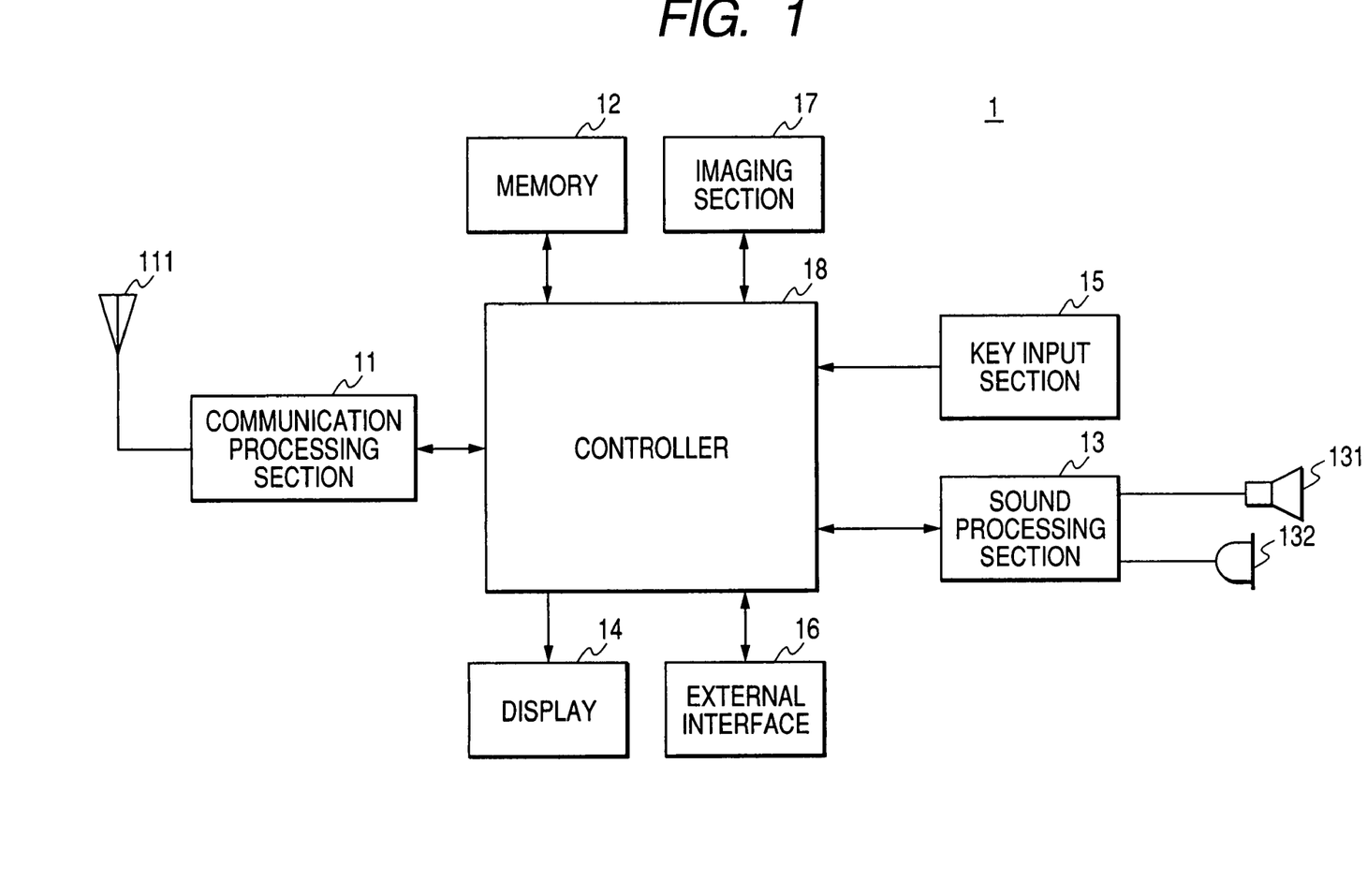
FIG. 1 is a view showing a system configuration of a cellular phone as one embodiment of a terminal apparatus according to the present invention.
Figure 2:
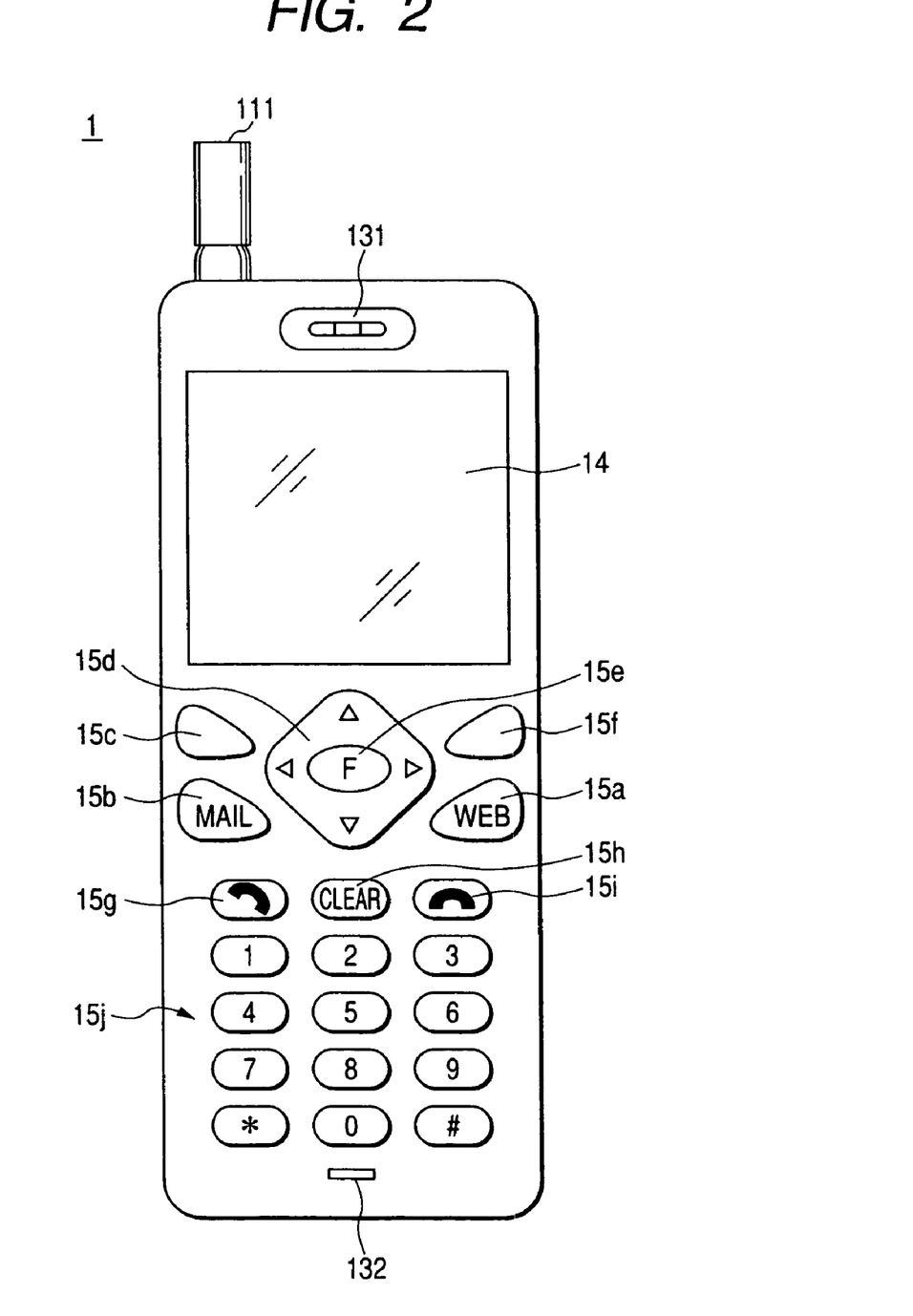
FIG. 2 is a view illustrating an example of an external appearance of a cellular phone according to an embodiment.

FIG. 1 is a view showing a system configuration of a cellular phone 1 as one embodiment of a terminal apparatus according to the present invention. FIG. 2 is a view illustrating an example of an external appearance of the cellular phone 1 according to the embodiment.

As shown in FIG. 1, the cellular phone 1 includes a communication processing section 11 having a transmitting/receiving antenna 111, a memory 12, a sound processing section 13 having a speaker 131 and a microphone 132, a display 14, a key input section 15, an external interface 16, an imaging section 17, and a controller 18.

The memory 12 is one embodiment of a first storing section and a second storing section of the present invention.

The display 14 is one embodiment of a display of the present invention.

The communication processing section 11 and the external interface 16 are embodiments of a plurality of output sections of the present invention.

The communication processing section 11 executes a radio communication operation via a base station, e.g., a calling operation of a telephone number, transmitting/receiving operation of an e-mail, and the like.

The communication processing section 11 is configured to include the transmitting/receiving antenna 111. In order to execute the radio communication via radio waves, the communication processing section 11 modulates various data such as sound information and e-mails, which are processed in the controller 18, and then transmits (outputs) the data to the base station (not shown) via the transmitting/receiving antenna 111.

Also, the communication processing section 11 demodulates various data such as sound information and e-mails, which are transmitted from the base station by radio communication and received via the transmitting/receiving antenna 111, and then supplies the data to the controller 18.

The communication processing section 11 performs communication that is adapted for a predetermined communication system such as CDMA 1x, for example. Thus, the communication processing section 11 can access and download data stored in a server apparatus (not shown) on a network.

The memory 12 is configured to include a nonvolatile memory such as EEPROM (electrically erasable programmable read-only memory). The memory 12 stores (saves) various data such as control programs for telephone conversation and transmission/reception of the e-mails, an Internet browser, message data, an address book in which names and telephone numbers are registered, image data (image file), and various files.

The memory 12 also stores (saves) output history data indicating histories of the above various data that are output from the cellular phone 1 via the communication processing section 11 or the external interface 16. The output history data are stored in association with the above various data.

The output history data include information indicating output destination, output day and time, and output section (in the present embodiment, a way of the output performed by the communication processing section 11 or the external interface 16). The information included in the output history data are not limited to these data. Any information may be included in the output history data as long as, after the output of certain data, the user can check the output history of such data.

For example, the output history data may include at least any one of the output destination, the output day and time, and an indication to identify the output section, of certain data being output from the output section. Here, the "indication to identify the output section" signifies an indication such as the system, a type, a classification and a specific name, of the output section, which are used to identify the individual output section.

The sound processing section 13 has a sound processing circuit. The speaker 131 for a sound output in a phone call function, and the microphone 132 for a sound input are connected to the sound processing section 13.

The sound processing section 13 applies a predetermined process such as a coding process to the sound collected by the microphone 132, and then supplies the coded sound to the controller 18.

Also, the sound processing section 13 applies a predetermined process such as a decoding process to sound information supplied from the controller 18, and then causes the speaker 131 to output the encoded sound information.

As shown in FIG. 2, the display 14 includes a display device such as a liquid crystal display device (LCD) disposed on an upper portion of a casing of the cellular phone 1. Text data, image, or the like are displayed on the display device based on an instruction issued from the controller 18.

The key input section 15 is configured to have a plurality of input keys (referred simply to as "key" hereinafter). As shown in FIG. 2, the plurality of keys include a web key 15a used to connect to the Internet, a mail key 15b used to execute an e-mail function, a soft 1 key 15c and a soft 2 key 15f, an up/down/left/right key 15d, a decision key 15e used to determine a process, an off-hook key 15g used to start the phone call, a clear key 15h, an on-hook key 15i used to end the phone call, and a numeric keyboard 15j corresponding to numerals "0" to "9", "*" and "#".

The decision key 15e, the soft 1 key 15c and the soft 2 key 15f are keys whose actions in response to a user's operation are set different based on a display state of the display 14. Contents of the actions in response to the user's operation are displayed on a lowermost portion of a screen of the display 14.

The up/down/left/right key 15d is a key available for a control in four directions of up, down, left and right. For example, in a case where the display 14 displays a plurality of selecting items as a list, the user can specify one selecting item from the plurality of selecting items by operating the up/down/left/right key 15d.

The key input section 15 has an input circuit. When the user's operation (pressing) is performed on the above keys, the key input section 15 transmits an electric signal to the controller 18 via the input circuit. The controller 18 detects this electric signal, and executes a process that corresponds to the operated key.

The external interface 16 is configured to include an interface circuit which outputs various data such as image data (image file) acquired by the imaging section 17 to an external equipment such as a printer and an external memory, for example, via wired or wireless communication. As a communication system of the external interface 16, there are a short distance radio communication, a communication via USB (universal serial bus), a serial communication such as RS232, an infrared communication, an optical communication, a parallel transmission and the like.

The imaging section 17 is configured to include a condensing lens for forming an image of a subject, a CCD (charge coupled device) for converting the formed image into an electric signal, a signal processing circuit for generating image digital data (image data) by applying signal processing to the electric signal, and the like.

The controller 18 is configured mainly with a microcomputer, and executes an overall control of the cellular phone 1. For example, the controller 18 executes a control of the transmission/reception of the various information over the radio in the communication processing section 11, a processing of the sound information for the sound processing section 13, a control of the display of the information in the display 14, the processing based on the input information from the key input section 15, an access control to the memory 12, and the like.

The controller 18 detects the pressing of a predetermined key in the key input section 15, and sends out an imaging request signal to the imaging section 17. Also, the controller 18 stores the image data acquired by the imaging section 17 in the memory 12.

The controller 18 manages the output history data stored in the memory 12. For example, the controller 18 generates and updates the output history data, and displays the contents of the output history data on the display 14.

More particularly, when the data stored in the memory 12 is output to the external equipment from the cellular phone 1 via the communication processing section 11 or the external interface 16, the controller 18 generates the output history data and then stores the output history data in association with the data. When the output history data corresponding to the data already exists in the memory 12, the controller 18 updates the output history data. Further, the controller 18 displays the contents of the specified output history data on the display 14 in response to the pressing of the key input section 15.

Next, an operation of the cellular phone 1 will be explained hereunder.

First, a process executed when various data stored in the memory 12 are output will be explained with reference to FIG. 3 and FIG. 4 hereunder.

Figure 3:
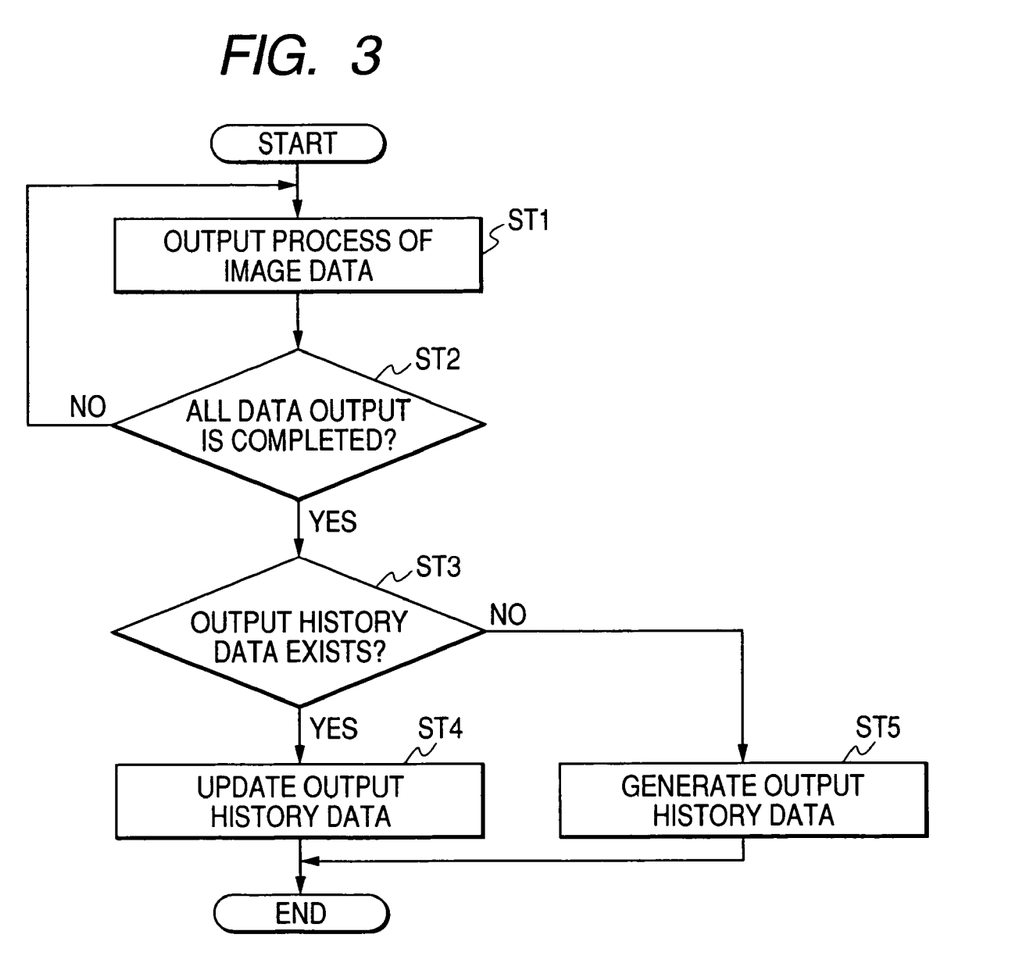
FIG. 3 is a flowchart showing a process executed when data is output.

FIG. 3 is a flowchart showing the process executed when the data stored in the memory 12 such as image data (image file), for example, is output.

In FIG. 3, in response to a predetermined user's operation to the key input section 15, the output of the image data specified by the user is started through the external interface 16 via the infrared communication, for example, (step ST1). Then, when the data output of the image data is completed (step ST2), the controller 18 checks whether or not the output history data corresponding to the output image data exists (step ST3).

As a result, when the output history data corresponding to the output image data exists in the memory 12, the controller 18 updates the output history data (step ST4). That is, the output destination of the image data, the output day and time, and the system, which is the infrared communication in this case, are added to the output history data.

When the output history data corresponding to the output image data does not exist, the output history data including the output destination of the image data, the output day and time, and the system, which is the infrared communication in this case, is newly generated (step ST5). Then, the generated output history data is stored in the memory 12 in association with the output image data.

Figure 4:
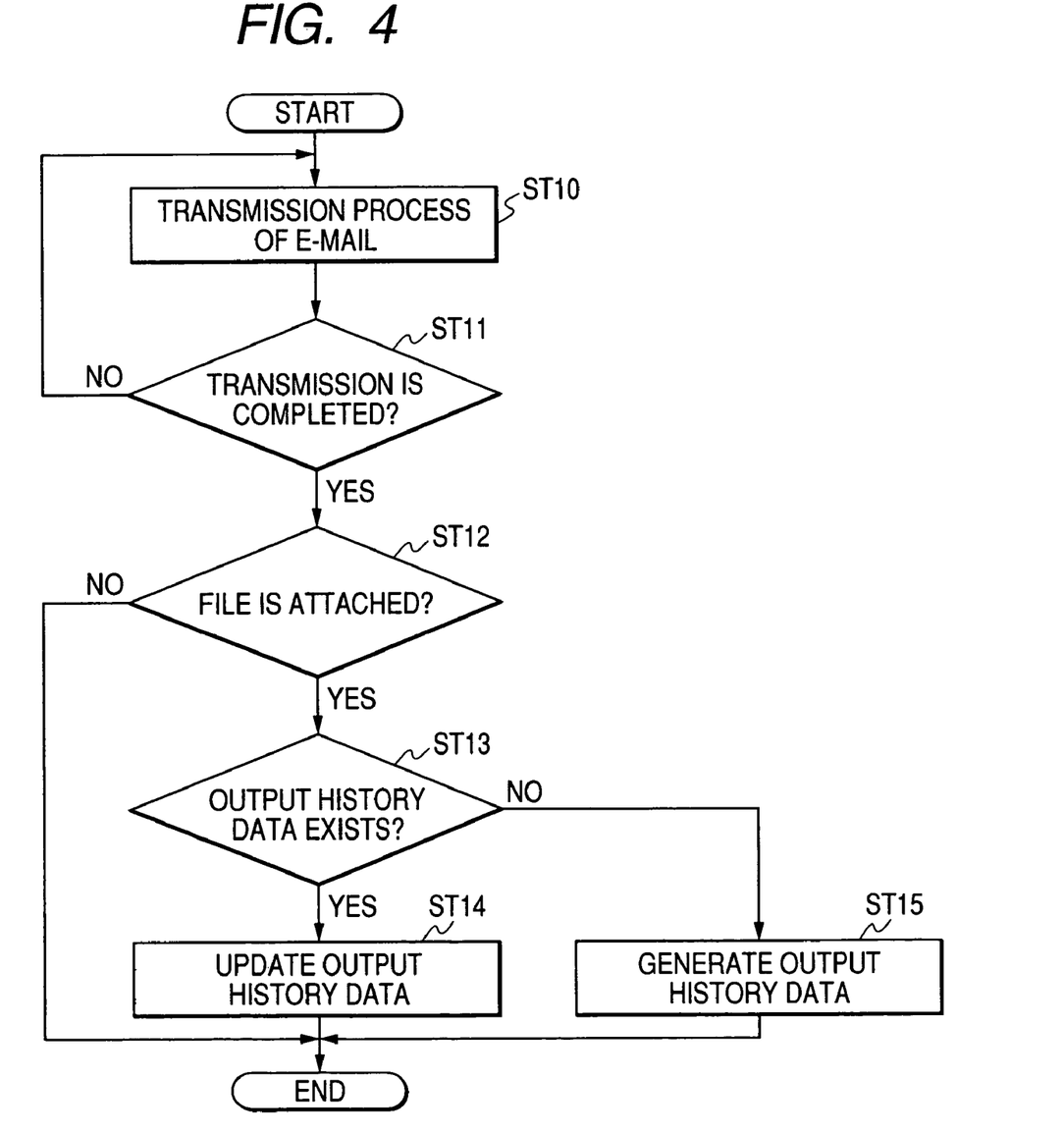
FIG. 4 is a flowchart showing a process executed when an e-mail is transmitted (output).

FIG. 4 is a flowchart showing a process executed when the e-mail, for example, is transmitted (output).

In FIG. 4, in response to a predetermined user's operation to the key input section 15, the transmission (output) of the generated e-mail is started via the communication processing section 11 (step ST10). Then, when the transmission of the e-mail is completed (step ST11), the controller 18 ends the process when a file is not attached to the transmitted e-mail (step ST12).

When the file (data) is attached to the transmitted e-mail (step ST12), the controller 18 checks whether or not the output history data corresponding to the attached file exists (step ST13).

As a result, when the output history data corresponding to the attached file exists in the memory 12, the controller 18 updates the output history data (step ST14). That is, the output destination of the attached file, the output day and time, and the indication that the output is performed via the attachment to the e-mail in this case (i.e., via the communication processing section 11), are added to the output history data. At that time, the output history data is correlated with the transmitted e-mail, and the user can refer to a content of the e-mail based on the output history data.

When the output history data corresponding to the attached file does not exist in the memory 12, the output history data including the output destination of the attached file, the output day and time, and the indication that the output is performed via the attachment to the e-mail in this case, is newly generated (step ST15). Then, the generated output history data is stored in the memory 12 in association with the attached file. In this case, the output history data is also correlated with the transmitted e-mail.

Next, a process of displaying an output history corresponding to the various data stored in the memory 12 will be explained with reference to FIGS. 5 to 7B hereunder.

Figure 5:
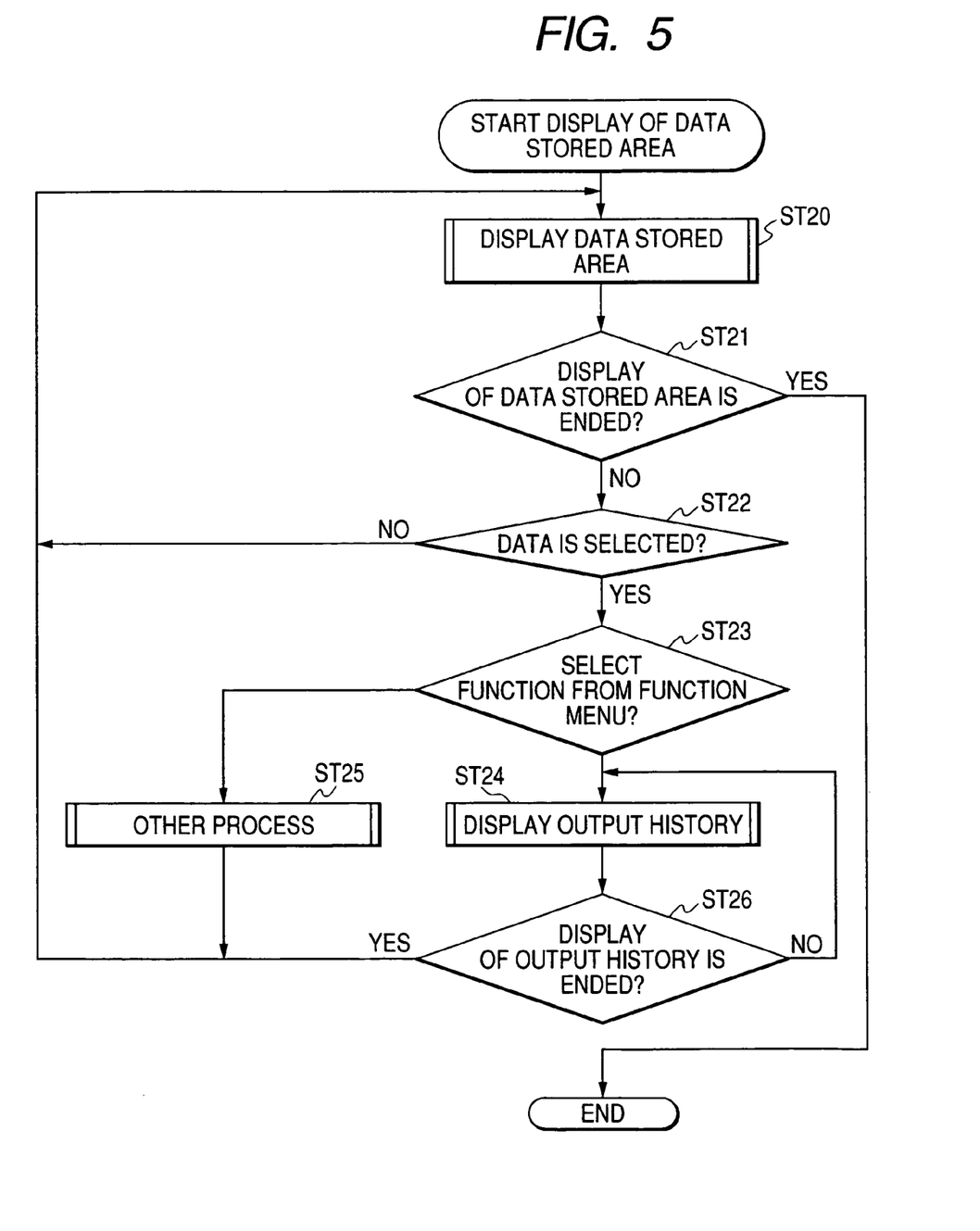
FIG. 5 is a flowchart showing a process of displaying an output history corresponding to data.
Figure 6A:
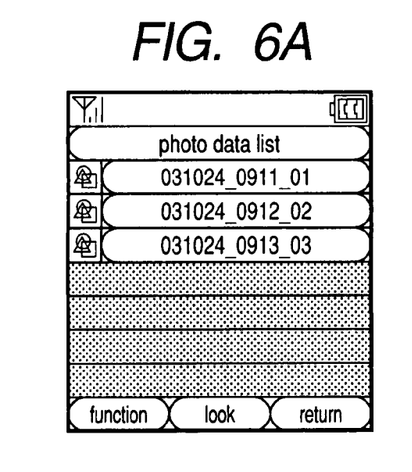
FIGS. 6A to 6E are views showing display screens when an output history is displayed.

FIG. 5 is a flowchart showing a process of displaying the output history corresponding to the data stored in the memory 12 such as the image data (image file), for example. FIGS. 6A to 6E are views showing display screens when the output history is displayed. In this case, the display screens shown in FIGS. 6A to 6E give an example of the output history corresponding to the image data (photo data), as shown in FIG. 6A.

In FIG. 5, first, in response to a predetermined user's operation to the key input section 15, a list of the data is displayed on the display screen of the display 14 (step ST20). For example, in an example shown in FIG. 6A, the image data (photo data) for three images are displayed.

In this state, when an invalid key such as the off-hook key 15g, for example, is pressed by the user in a screen condition as shown in FIG. 6A (step ST21), the process is ended.

Figure 6B:
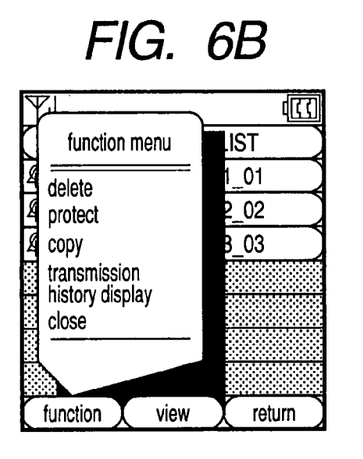

On the contrary, when any image data is selected from the image data for the three images by the up/down/left/right key 15d, for example, (step ST22), and then a function menu is selected by the soft 1 key 15c, a process corresponding to the selected function menu is executed (step ST23). In FIG. 6B, an example of a display of the function menu is shown.

Here, when the user selects "transmission history display" among the function menu, the output history display is executed (step ST24). More concretely, the controller 18 accesses the memory 12 to search the output history data corresponding to the selected image data, and displays the result in a format shown in FIG. 6C as an example. That is, the output day and time and the output section (mail attached, via serial, etc.) included in the output history data are displayed as a list.

Figure 6C:
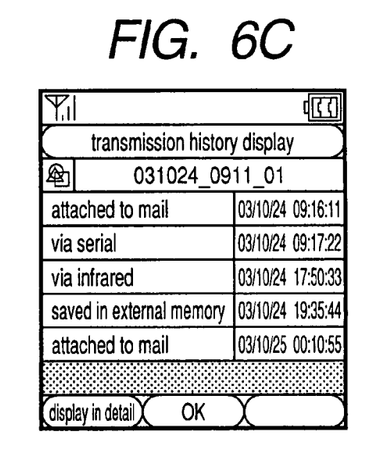
Figure 6D:
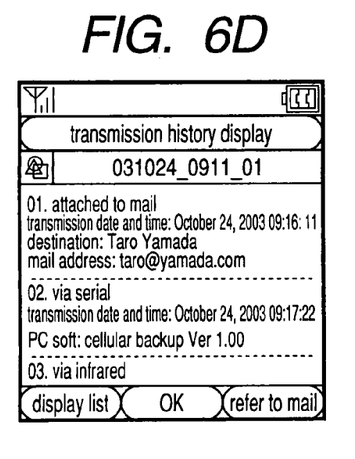
Figure 6E:
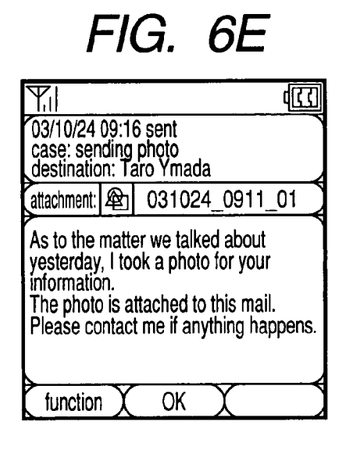

Also, as another display example, the output history is displayed in more detail as shown in FIG. 6D. That is, the output destination (to Taro Yamada, etc.) in addition to the output day and time and the output section (attached to mail, via serial, etc.) included in the output history data are displayed as a list.

In this case, as the output destination, the name and an e-mail address on the address book, a hardware name of the external memory, or a serial number may be displayed. Also, when the output destination is a personal computer, a software name to be a client, or its version number may be displayed. When the output destination is a terminal located outside, such as a so-called kiosk terminal, data about a terminal name or an installation location may be displayed.

Also, when the selected image is transmitted (output) as the attached file of the e-mail, as the e-mail is correlated with the output history data, the contents (body) of the e-mail may be referred to (FIG. 6E) on the screen of the transmission history display as shown in FIG. 6C or FIG. 6D. Accordingly, it becomes much easier for the user to determine whether or not the image data can be deleted after the transmission (output).

In this manner, when other data (data name, the contents of the e-mail, etc.) which is different from the image data are output from the output section together with the image data, the output history of the image data is displayed and also information of the above other data are displayed. Accordingly, it becomes much easier for the user to determine whether or not the image data can be deleted.

In step ST23, when "delete" is selected from the function menu, the output history of the image data to be deleted may be displayed before a deleting process of the selected image data is executed. Accordingly, it can be prevented that the data that the user does not intend to delete is deleted inadvertently.

Here, "before the deleting process is executed" is exemplified with the case where the data is selected for the deleting process (operation), a case where a signal instructing to delete the selected data is output, and the like.

The explanation goes back to the flowchart in FIG. 5.

When the item other than the "transmission history display" is selected from the function menu, a process corresponding to the selection is executed (step ST25). Also, when the "transmission history display" is selected, the output history display is executed (step ST24) until the end of the output history display is instructed by operating the key input section 15 (step ST26).

Figure 7A:
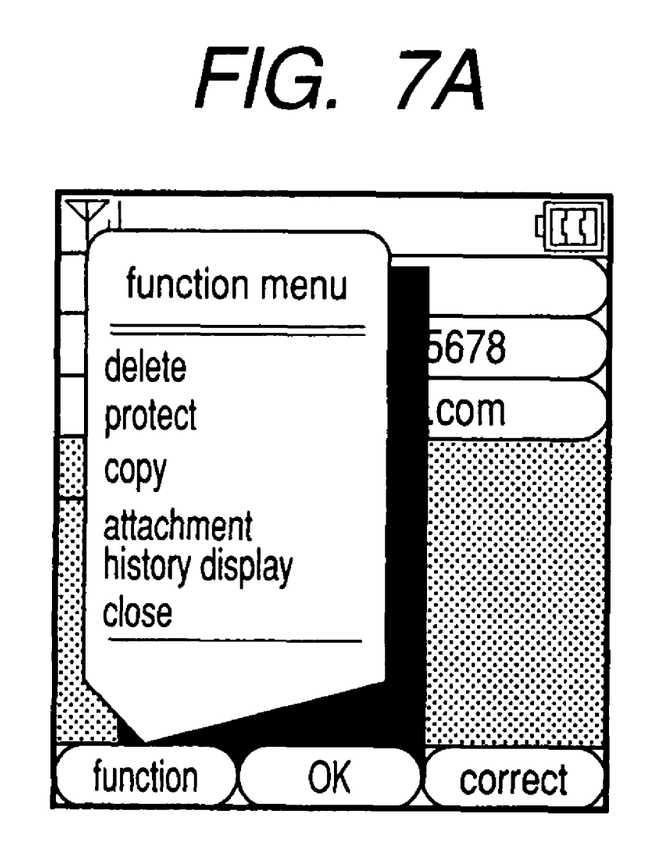
FIGS. 7A and 7B are views explaining an attachment history display.
Figure 7B:
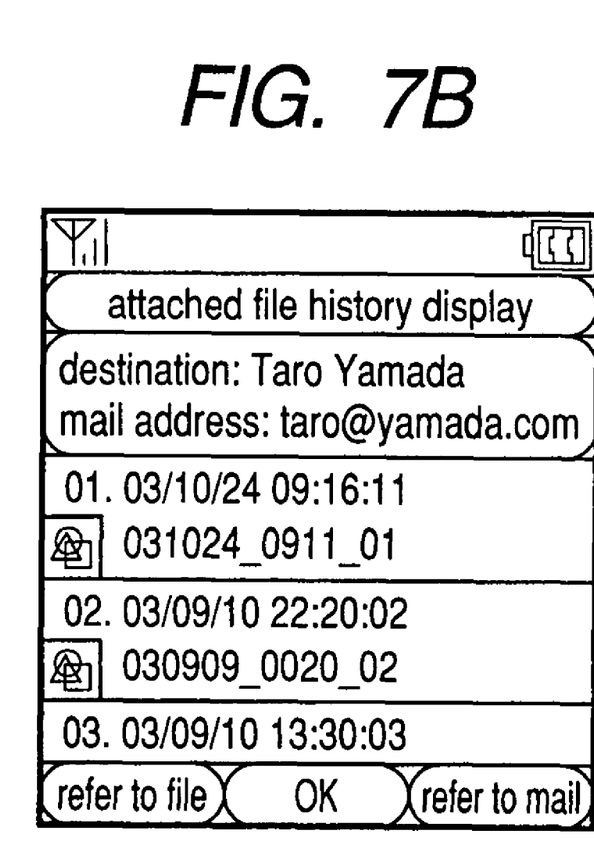

In this case, an attachment history display to indicate that the data (file) is output (transmitted) by being attached to the e-mail may be selected from the function menu. FIGS. 7A and 7B are views explaining the attachment history display.

As shown in FIG. 7A, the item, "attachment history display", is displayed in the function menu. When this "attachment history display" is selected, a list of the data (e.g., image file) attached to the e-mail is displayed for every destination, as shown in FIG. 7B. Here, in response to the selection of the attachment history display, a list of the destinations (names or e-mail addresses) is displayed, and then a process of selecting one destination is executed. When the destination is selected, the controller 18 searches for the output history data including that destination (output destination), then specifies the transmitted data by being attached to the e-mail, and then displays the data including the transmitted day and time (output day and time) as a list.

Accordingly, since the user can see the destination and the transmitted day and time simultaneously, the user can easily determine whether or not the image data can be deleted.

As explained above, according to the cellular phone 1 of the present embodiment, when various data included in the memory 12 is output to the outside, the output history data including the output destination, the output day and time and the output section is generated/updated while being correlated with the data. Then, if required, an output history of the data can be displayed after the output. Therefore, following advantages can be achieved.

That is, when an available space of the memory 12 is low and a part of data in the memory 12 need to be deleted, the user can easily determine whether or not the data can be deleted, by referring to the contents (the output destination, the output day and time, and the output section) of the output history data being correlated with the data.

For instance, there are cases where the image data is already transmitted to a person who needs that image data, where the image data is already output to the external memory for back up, where the image data is already printed out by an external printer, and where the image data can be just deleted. According to the cellular phone 1 of the present embodiment, since the output history of the selected data can be checked immediately, the user can easily determine whether or not the current situation corresponds to one of the above cases.

An embodiment of the present invention is not restricted to the above embodiment, and various variations and modifications can be applied within a range not changing a gist of the present invention.

For example, in the above embodiment, the output history data are stored in the memory 12 in the form of being corresponding to the various data respectively. However, all of the output destination, the output day and time, and the output section may not be stored in the memory 12 in a centralized manner as the output history data. Since the output destination, the output day and time, and the output section included in the above output history data are included in various peripheral data such as e-mail data, the necessary information may be acquired sequentially from these peripheral data at the time when the "transmission history display" is selected from the function menu in FIG. 6B, for example, and then the transmission history may be displayed.

According to one or more embodiments of the invention, the user can understand where the data is output from the terminal apparatus.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A terminal apparatus for outputting image files, comprising:
   a plurality of output sections each configured to output an image file from the terminal apparatus to an external apparatus, wherein the image file remains in the terminal apparatus at least temporarily after being outputted, wherein said plurality of output sections comprise different types of output sections; and
   a display configured to display an output history for the image file, wherein the output history comprises a list to specify from which of the plurality of output sections the image file is outputted;
   wherein if the image file and another image file which is different from the image file are concurrently outputted from anyone of the output sections, the display displays both the output history of the image file and information of the another image file.

2. The terminal apparatus according to claim 1, further comprising:
   a selecting section for selecting one of the image files, wherein the display displays the output history of the selected image file.

3. The terminal apparatus according to claim 1, wherein the display displays the output history for each of the output sections.

4. The terminal apparatus according to claim 1, further comprising:
   a storing section for storing the image file; and
   a deleting section which deletes one of the image files from the storing section,
   wherein the display displays the output history of the image file to be deleted, before the image file is deleted by the deleting section.

5. The terminal apparatus according to claim 1, further comprising:
   a storing section for storing output history data in which the image file and the output history of the image file are correlated with each other,
   wherein the display displays the output history based on the output history data.

6. The terminal apparatus according to claim 5, wherein in response to the output of the image file from any one of the output sections, the output history data corresponding to the image file is updated.

7. The terminal apparatus according to claim 1, wherein the plurality of the output sections include at least two systems selected from the group consisting of a wired communication, a wireless communication, an optical communication, an infrared communication, a universal serial bus, a serial transmission, and a parallel transmission.

8. The terminal apparatus according to claim 1, wherein the output history includes at least any one of an output destination, an output day and time, and an indication to identify the output section, of the image file being output.

9. A terminal apparatus for outputting image files to an external apparatus, comprising:
   a plurality of output sections each configured to output an image file to the external apparatus, wherein the image file remains in the terminal apparatus at least temporarily after being outputted, wherein said plurality of output sections comprise different types of output sections;
   a first storing section configured to store output history data in which the image file and an output history of the image file are correlated with each other, wherein the output history comprises information to specify from which of the plurality of output sections the image file is outputted, and an output destination for the image file outputted via the output sections; and
   a display displaying as a list a plurality of output sections through which the output image file was sent;
   wherein the display is configured to display the output history for each of the image files, wherein if the image file and another image file which is different from the image file are concurrently outputted from anyone of the output sections, the display displays both the output history of the image file and information of the another image file.

10. The terminal apparatus according to claim 9, further comprising:
    a selecting section for selecting one of the image files,
    wherein the display is configured to display the output history for each of the image files, wherein the display displays the output history of the selected image file.

11. The terminal apparatus according to claim 9, wherein the display is configured to display the output history for each of the image files, wherein the display displays the output history for each of the output sections.

12. The terminal apparatus according to claim 9, further comprising:
    a second storing section for storing the image file; and
    a deleting section which deletes one of the image files from the second storing section;
    wherein the display is configured to display the output history for each of the image files,
    wherein the display displays the output history of the image file to be deleted, before the image file is deleted by the deleting section.

13. The terminal apparatus according to claim 9, wherein the display is configured to display the output history for each of the image files, wherein the display displays the output history based on the output history data.

14. The terminal apparatus according to claim 13, wherein in response to the output of the image file from any one of the output sections, the output history data corresponding to the image file is updated.

15. The terminal apparatus according to claim 9, wherein the plurality of the output sections include at least two systems selected from the group consisting of a wired communication, a wireless communication, an optical communication, an infrared communication, a universal serial bus, a serial transmission, and a parallel transmission.

16. The terminal apparatus according to claim 9, wherein
    the display is configured to display the output history for each of the image files, and
    the output history includes at least any one of an output section, an output day and time, and an indication to identify the output section, of the image file being output.

* * * * *